United States Patent
Yamada

(10) Patent No.: US 10,847,821 B2
(45) Date of Patent: Nov. 24, 2020

(54) TEMPERATURE DETECTING DEVICE AND INSERTION HOLE STRUCTURE OF BASE

(71) Applicant: HONDA MOTOR CO., LTD., Tokyo (JP)

(72) Inventor: Kentaro Yamada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 335 days.

(21) Appl. No.: 15/854,079

(22) Filed: Dec. 26, 2017

(65) Prior Publication Data

US 2018/0183079 A1    Jun. 28, 2018

(30) Foreign Application Priority Data

Dec. 28, 2016 (JP) ................ 2016-255029
Mar. 6, 2017 (JP) ................ 2017-041375

(51) Int. Cl.
*H01M 8/0432* (2016.01)
*H01M 2/10* (2006.01)
(Continued)

(52) U.S. Cl.
CPC ......... *H01M 8/04373* (2013.01); *H01M 2/10* (2013.01); *H01M 2/1077* (2013.01); *H01M 8/04067* (2013.01); *H01M 8/04365* (2013.01); *H01M 10/486* (2013.01); *H01M 2220/20* (2013.01); *H01M 2250/20* (2013.01); *Y02T 90/40* (2013.01)

(58) Field of Classification Search
None
See application file for complete search history.

(56) References Cited

U.S. PATENT DOCUMENTS 8,951,653 B2 * 2/2015 Kurita ................ H01M 2/1077
  248/222.12
2010/0055993 A1 * 3/2010 Ikeda ................ H01M 2/1077
  439/754

(Continued)

FOREIGN PATENT DOCUMENTS

JP    2006-186045    7/2006
JP    2012-256467    12/2012
(Continued)

OTHER PUBLICATIONS

Japanese Office Action for Japanese Patent Application No. 2017-041375 dated Jun. 25, 2019.
(Continued)

*Primary Examiner* — Rena Dye Cronin
(74) *Attorney, Agent, or Firm* — Amin, Turocy & Watson, LLP

(57) ABSTRACT

A temperature detecting device is equipped with an insertion hole structure for guiding a case which is inserted from outside into a holder that covers an outer wall of a battery cell, to the outer wall of the battery cell. In this insertion structure, a plurality of load distribution portions, specifically a first structure and a second structure, are formed at the periphery of an opening of an insertion hole. The load is generated upon abutment on a foreign matter that is about to enter through the insertion hole toward the battery cell. The load distribution portions distribute and release a load to the periphery of the opening.

5 Claims, 13 Drawing Sheets

(51) Int. Cl.
*H01M 8/04007* (2016.01)
*H01M 10/48* (2006.01)

(56) References Cited

U.S. PATENT DOCUMENTS

| | | | | |
|---|---|---|---|---|
| 2012/0322320 | A1* | 12/2012 | Takase | H01M 2/206 |
| | | | | 439/732 |
| 2015/0303435 | A1* | 10/2015 | Ikeda | H01M 2/206 |
| | | | | 429/121 |
| 2016/0035467 | A1* | 2/2016 | Haydin | G01R 31/396 |
| | | | | 429/90 |
| 2016/0126601 | A1* | 5/2016 | Ichikawa | H02J 7/0091 |
| | | | | 374/152 |
| 2017/0194771 | A1* | 7/2017 | Aoki | G01K 1/146 |
| 2018/0342717 | A1* | 11/2018 | Shoji | H01M 2/206 |

FOREIGN PATENT DOCUMENTS

| | | | |
|---|---|---|---|
| JP | 2014-089912 | 5/2014 | |
| JP | 2014-212026 | 11/2014 | |
| WO | WO-2015186421 A1 * | 12/2015 | H01M 2/10 |

OTHER PUBLICATIONS

Japanese Office Action for Japanese Patent Application No. 2017-041375 dated Dec. 11, 2018.

* cited by examiner

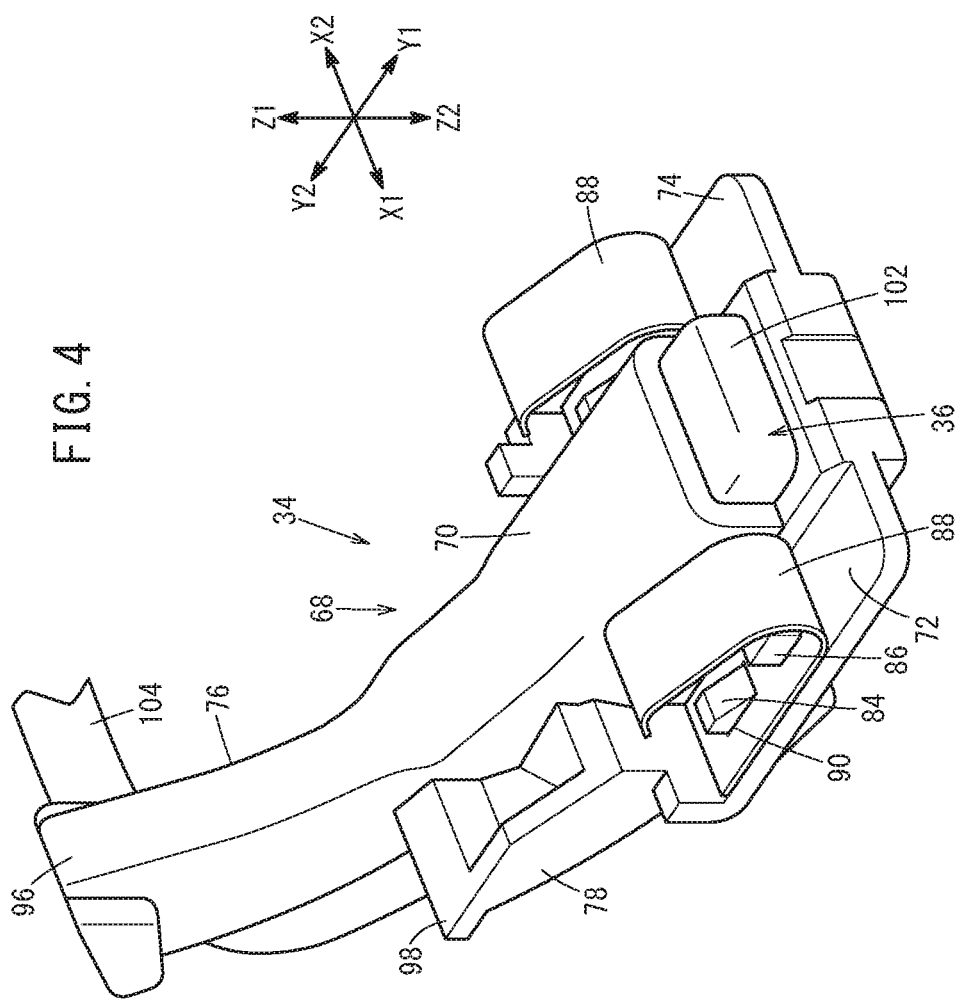

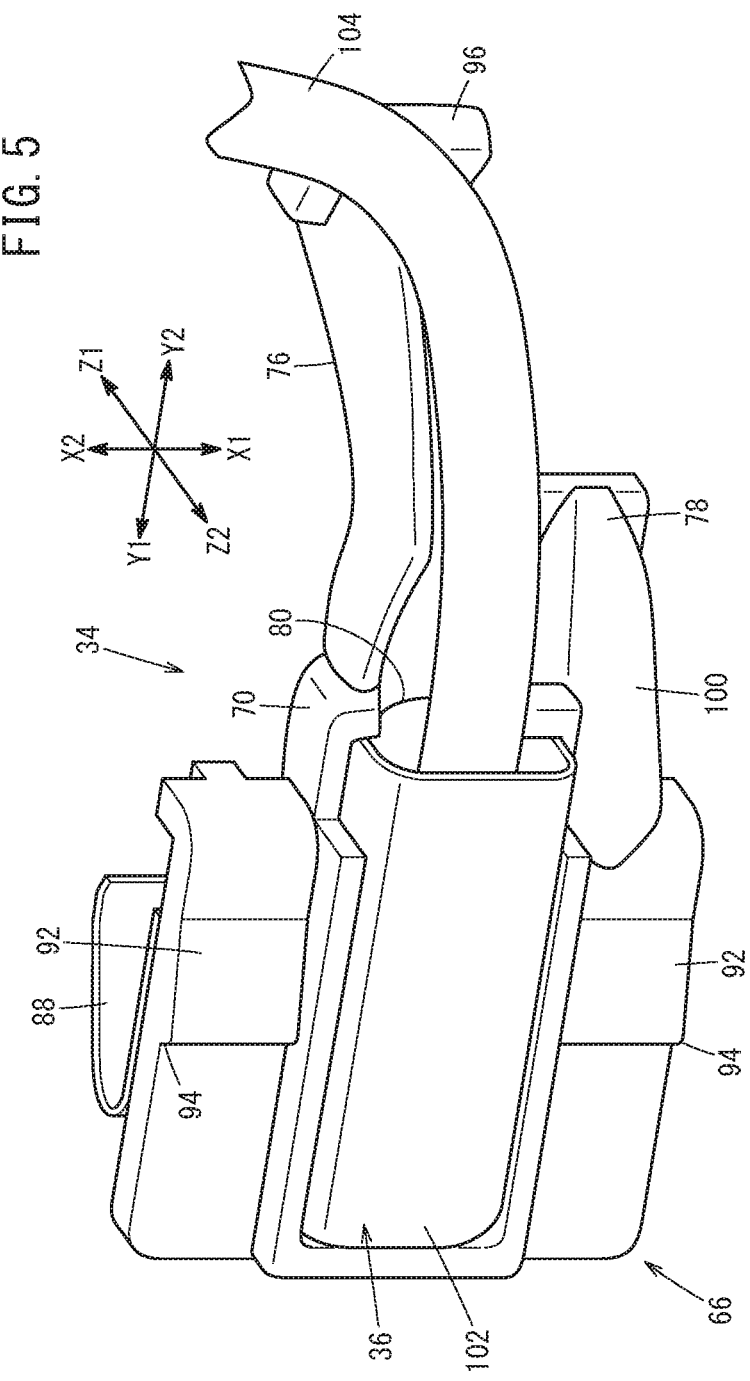

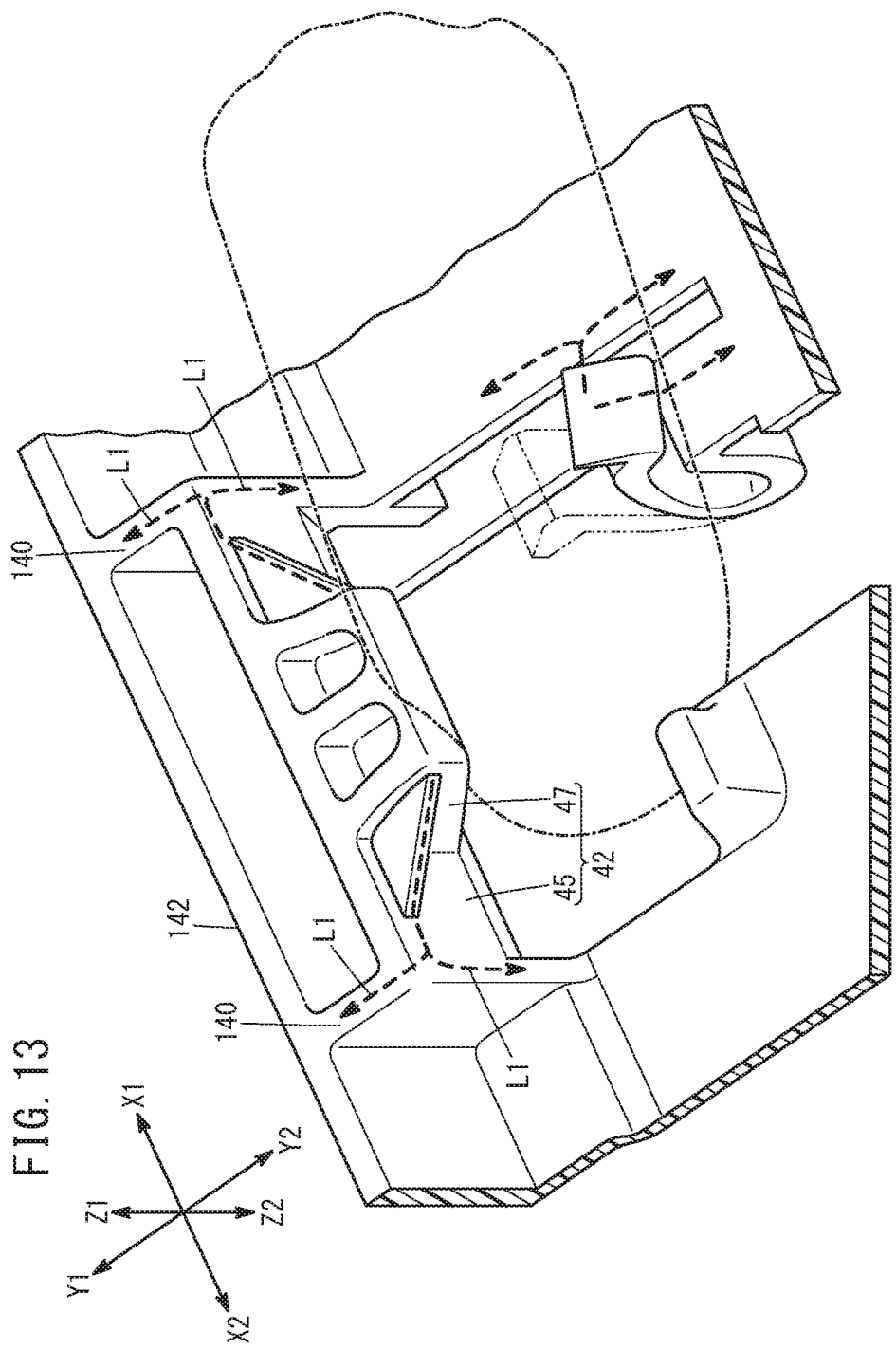

TEMPERATURE DETECTING DEVICE AND INSERTION HOLE STRUCTURE OF BASE

CROSS-REFERENCE TO RELATED APPLICATIONS

This application is based upon and claims the benefit of priority from Japanese Patent Applications No. 2016-255029 filed on Dec. 28, 2016 and No. 2017-041375 filed on Mar. 6, 2017, the contents all of which are incorporated herein by reference.

BACKGROUND OF THE INVENTION

Field of the Invention

The present invention relates to a temperature detecting device for measuring the temperature of a high-voltage battery as used in an electric vehicle (including a hydrogen fuel cell vehicle) and a hybrid vehicle (including a plug-in hybrid vehicle). The present invention also relates to an insertion hole structure of a base for such a temperature detecting device and the like.

Description of the Related Art

Japanese Laid-Open Patent Publication No. 2014-212026 discloses a device in which a thermistor (temperature detection element) is attached to battery cells (a temperature detection object) held by a battery holder for detecting the temperature of the battery cells by using the thermistor. In this device, the thermistor is attached to an outer wall surface of a battery cell, and further, the thermistor is pressed by a portion of a bus bar cover (base). Thus, the thermistor is prevented from coming off from a predetermined accommodation portion.

SUMMARY OF THE INVENTION

In order to enable the thermistor to demonstrate its temperature detection performance, a temperature detection surface of the thermistor is required to contact the temperature detection object properly. If a battery module is assembled in a state that the attaching state of the thermistor to the battery cell is insufficient, a possibility arises that the temperature of the battery cell becomes unable to be detected accurately. Further, there is room to improve the strength of the bus bar cover.

The present invention has been made with the aforementioned problems taken into consideration, and it is an object of the present invention to provide a temperature detecting device capable of improving the working property in attaching a temperature detection unit to a temperature detection object. It is also another object of the present invention to provide a temperature detecting device and an insertion hole structure of a base capable of improving the strength at the periphery of an insertion hole into which an insert such as a temperature detection unit or the like is inserted.

As a feature of a first invention, a temperature detecting device comprises a temperature detection object, a base covering an outer wall of the temperature detection object, an insert configured to be inserted into an insertion hole of the base and to be guided to an outer wall of the temperature detection object, and a temperature detection unit attached to the insert. The insert includes a first surface located near the temperature detection object in an attached state that the insert is attached to the base, a second surface located on a back side of the first surface, a base portion configured to accommodate the temperature detection unit with a part of the temperature detection unit exposed from the first surface side, and a grip portion extending from a starting point at the base portion in a direction away from the temperature detection object in the attached state. The base includes an accommodation portion configured to accommodate the base portion with the part of the temperature detection unit in contact with the temperature detection object in the attached state, a first structure configured to guide the first surface toward the temperature detection object at time of insertion of the insert, and a second structure configured to guide the second surface toward an upper side of the accommodation portion at the time of the insertion of the insert. According to this configuration, when the insert is inserted into the base to become the attached state, the base portion is positioned along the temperature detection object. Because such a structure enables a push-in direction to differ from an insertion direction, a working property can be improved in attaching the temperature detection unit relative to the temperature detection object. Further, because it is possible to attach the temperature detection unit to the temperature detection object by simply inserting the insert into the base from the outside of the base, the working property can be improved in attaching the temperature detection unit relative to the temperature detection object.

Preferably, the first structure and the second structure may be arranged in a face-to-face relation and may be configured to regulate an insertion initial position and/or an insertion direction of the insert. With this configuration, even if the insert is inserted into the base at an insertion angle which differs from a regular insertion angle, the insertion initial position and the insertion direction are regulated, so that the insert can be guided to a right insertion posture or position.

Preferably, the base may include an engaging claw portion configured to engage the insert in the attached state, and the insert may include an engagement receiving portion configured to be engaged with the engaging claw portion in the attached state, the engagement receiving portion provided on at least one side of the base portion in a width direction perpendicular to the insertion direction. With this configuration, since the engaging claw portion and the engagement receiving portion are arranged on an end portion in the width direction, it becomes easy for the worker to visually confirm an engagement state of the insert with the base.

Preferably, the first structure may be equipped with a flexible portion configured to guide the engagement receiving portion while being bent at the time of the insertion of the insert. With this configuration, a stable guiding operation becomes possible because the base portion is guided flexibly.

Preferably, the insert may include an elastic member which, in the attached state, is interposed between the second surface and an inner surface on an upper side of the accommodation portion to press the base portion toward the temperature detection object. With this configuration, since the temperature detection unit is brought into close contact with the temperature detection object, it is possible to improve the temperature detection accuracy and to provide a guide receiving function to the second structure at the time of the insertion.

Preferably, the grip portion may be curved to go away from the temperature detection object as the grip portion extends in a direction to an end thereof in the attached state. With this configuration, the grip portion becomes easy to grip due to separation from the base, and hence, it becomes easy to exert a force on the insert in the insertion direction.

A temperature detecting device according to a second invention features comprising a temperature detection object, a base covering an outer wall of the temperature detection object, an insert configured to be inserted into an insertion hole of the base and to be guided to the outer wall of the temperature detection object, and a temperature detection unit attached to the insert, wherein a plurality of load distribution portions are formed at a periphery of an opening of the insertion hole, and are configured to distribute and release a load generated upon contact with a foreign matter that is about to enter through the insertion hole toward the temperature detection object. With this configuration, the plurality of load distribution portions formed at the periphery of the opening of the insertion hole can restrain the peripheral portion of the opening from being damaged when the foreign matter is inserted.

A third invention is an insertion hole structure of a base covering an outer wall of an attached object, wherein an insert is configured to be inserted into the base from outside, and to be guided to the outer wall of the attached object by the insertion hole structure, and wherein a plurality of load distribution portions are formed at a periphery of an opening of an insertion hole of the base and configured to distribute and release a load generated upon contact with a foreign matter which is about to enter through the insertion hole toward the attached object. With this configuration, the plurality of load distribution portions formed at the periphery of the opening of the insertion hole can restrain the peripheral portion of the opening from being damaged when the foreign matter is inserted.

Preferably, in the insertion hole structure of the base, the foreign matter may be a predetermined test finger, and the plurality of load distribution portions may have a strength capable of preventing the test finger from entering upon abutment on the test finger and withstand a load generated upon abutment on the test finger when the test finger with a predetermined load imposed is about to enter from the opening toward the attached object. With this configuration, it is possible to satisfy a predetermined test condition.

Preferably, in the insertion hole structure of the base, each of the load distribution portions may include a plurality of load transfer paths. With this configuration, the load can be distributed further efficiently by the plurality of load transfer paths, so that the peripheral portion of the opening can be prevented from being damaged when the foreign matter is inserted.

Preferably, in the insertion hole structure of the base, the plurality of load distribution portions may include a first structure and a second structure facing each other through the opening. With this configuration, it is possible to distribute the load efficiently by the first and second structures which face toward each other and to prevent the peripheral portion of the opening from being damaged when the foreign matter is inserted.

Preferably, in the insertion hole structure of the base, in a case that the outer wall of the attached object is taken as a reference position, the first structure may be disposed at a position in a vertically upward direction with respect to the reference position, and the second structure may be disposed at a position more upward than the first structure. With this configuration, it is possible to distribute the load exerted on the first structure and the load exerted on the second structure in different directions, and as a result, the peripheral portion of the opening can be prevented from being damaged when the foreign matter is inserted.

Preferably, in the insertion hole structure of the base, in a case that the outer wall of the attached object is taken as a reference position, the first structure may include a first stationary portion protruding in a vertically upward direction with respect to the reference position, and the second structure may include a wall portion extending in the vertically upward direction with respect to the reference position and a second stationary portion protruding from the wall portion in a direction in which the first structure is located, the second stationary portion including an upper portion that is larger in protruding amount than a lower portion. With this configuration, it becomes easy to guide the insert to the insertion hole.

Preferably, in the insertion hole structure of the base, the second stationary portion may include an end portion directed toward the first structure and a plurality of ribs formed between the end portion and the wall portion. With this configuration, it is possible to increase the strength of the second stationary portion.

Preferably, in the insertion hole structure of the base, the plurality of ribs extend in a direction perpendicular to the wall portion, and some of the ribs may be perpendicular to other ribs. With this configuration, it is possible to further increase the strength of the second stationary portion.

Preferably, in the insertion hole structure of the base, the first stationary portion may include a plurality of leg portions extending toward the attached object. With this configuration, it is possible to distribute the load and to increase the strength of the first stationary portion.

Preferably, in the insertion hole structure of the base, the insertion hole may be inclined relative to the outer wall of the attached object. With this configuration, it is possible to distribute the load and to guide the insert to the insertion hole easily.

According to the present invention, the peripheral portion of the opening can be prevented from being damaged when a foreign matter is inserted.

The above and other objects, features, and advantages of the present invention will become more apparent from the following description when taken in conjunction with the accompanying drawings, in which a preferred embodiment of the present invention is shown by way of an illustrative example.

BRIEF DESCRIPTION OF THE DRAWINGS

FIG. 4 is a perspective view showing a back side, an upper side, and a right side of a case;

FIG. 5 is a perspective view showing a front side, a bottom side, and a left side of the case;

FIG. 13 is a perspective view of a holder in still another form.

DESCRIPTION OF THE PREFERRED EMBODIMENTS

Hereinafter, a temperature detecting device according to the present invention will be described based on a preferred embodiment with reference to the accompanying drawings.

The temperature detecting device in the present embodiment is one for detecting the temperature of a battery cell provided in a battery module by the use of a thermosensitive element such as a thermistor or the like.

1 Structure of Temperature Detecting Device 24

[1.1 Definitions of Directions]

Figure 1:
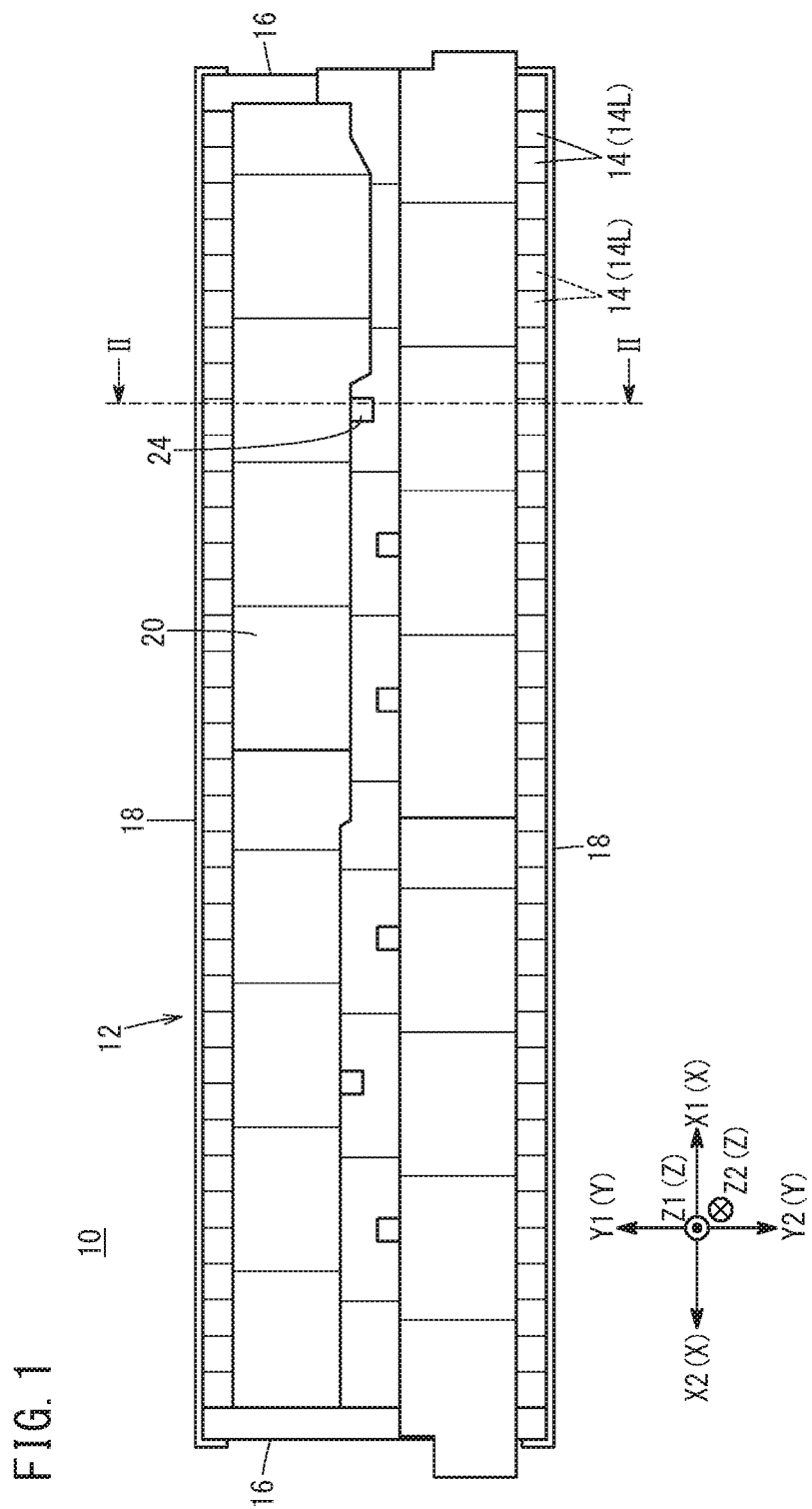
FIG. 1 is a plan view of a battery pack.

Hereunder, a description will be given by using directions which, for convenience, are determined with the temperature detecting device 24 (refer to FIG. 2) taken as a reference. Specifically, a width direction of the temperature detecting device 24 is defined as X, one of which (rightward direction) is defined as X1 and the other (leftward direction) is defined as X2. In FIG. 1, the X direction agrees to a longitudinal direction of a battery pack 10. Further, a longitudinal direction of the temperature detecting device 24 is defined as Y, one of which (insertion-forward direction) is defined as Y1 and the other (withdrawal direction) is defined as Y2. In FIG. 1, the Y direction agrees to a short-side direction of the battery pack 10. Further, a height direction of the temperature detecting device 24 is defined as Z, one of which (upward direction) is defined as Z1 and the other (downward direction) is defined as Z2. In FIG. 1, the Z direction agrees to the height direction of the battery pack 10.

[1.2 Battery Module 12]

A battery module 12 will be described with reference to FIG. 1. FIG. 1 is a plan view of the battery pack 10. FIG. 1 schematically shows the battery pack 10. The battery pack 10 shown in FIG. 1 has a plurality of battery modules 12 stacked in the Z direction. Each battery module 12 has a plurality of battery cells 14, two end plates 16, two connection plates 18 and bus bar plates 20. The battery cell 14 is an almost rectangular shape, and the plurality of battery cells 14 are stacked in the X direction to constitute a stack 14L of the battery cells 14. The two end plates 16 are attached respectively to an X1-direction end surface and an X2-direction end surface of the stack 14L of the battery cells 14. The two connection plates 18 are attached respectively to a Y1-direction end surface and a Y2-direction end surface of the stack 14L of the battery cells 14. The bus bar plates 20 are attached to a Z1-direction end surface of the stack 14L of the battery cells 14. The end portions of the respective connection plates 18 and the bus bar plates 20 in the X1-direction are connected to the end plate 16 in the X1-direction by bolts or the like, and X2-direction end portions of them are also connected to the end plate 16 in the X2-direction by bolts or the like. The periphery of the stack 14L of the battery cells 14 is covered with the two end plates 16, the two connection plates 18, and the bus bar plates 20. Each of the bus bar plates 20 has an exterior formed of a resin and has an interior metal plate. The metal plate of each of the bus bar plates 20 electrically connects the respective battery cells 14 in series.

The battery module 12 is equipped with a temperature detecting device 24 for detecting the temperature of the battery cell 14 by a thermosensitive element such as a thermistor or the like. Each of the bus bar plates 20 is attached to the stack 14L of the battery cells 14 in the Z1 direction. An insertion hole 26 (refer to FIG. 2) is formed in the bus bar plate 20, through which a temperature detection unit 36 (refer to FIG. 2) is inserted from the outside into the inside of the battery module 12 so that the temperature detection unit 36 can be attached along the outer wall 14a of the batter cell 14.

[1.3 Temperature Detecting Device 24]

Figure 2:
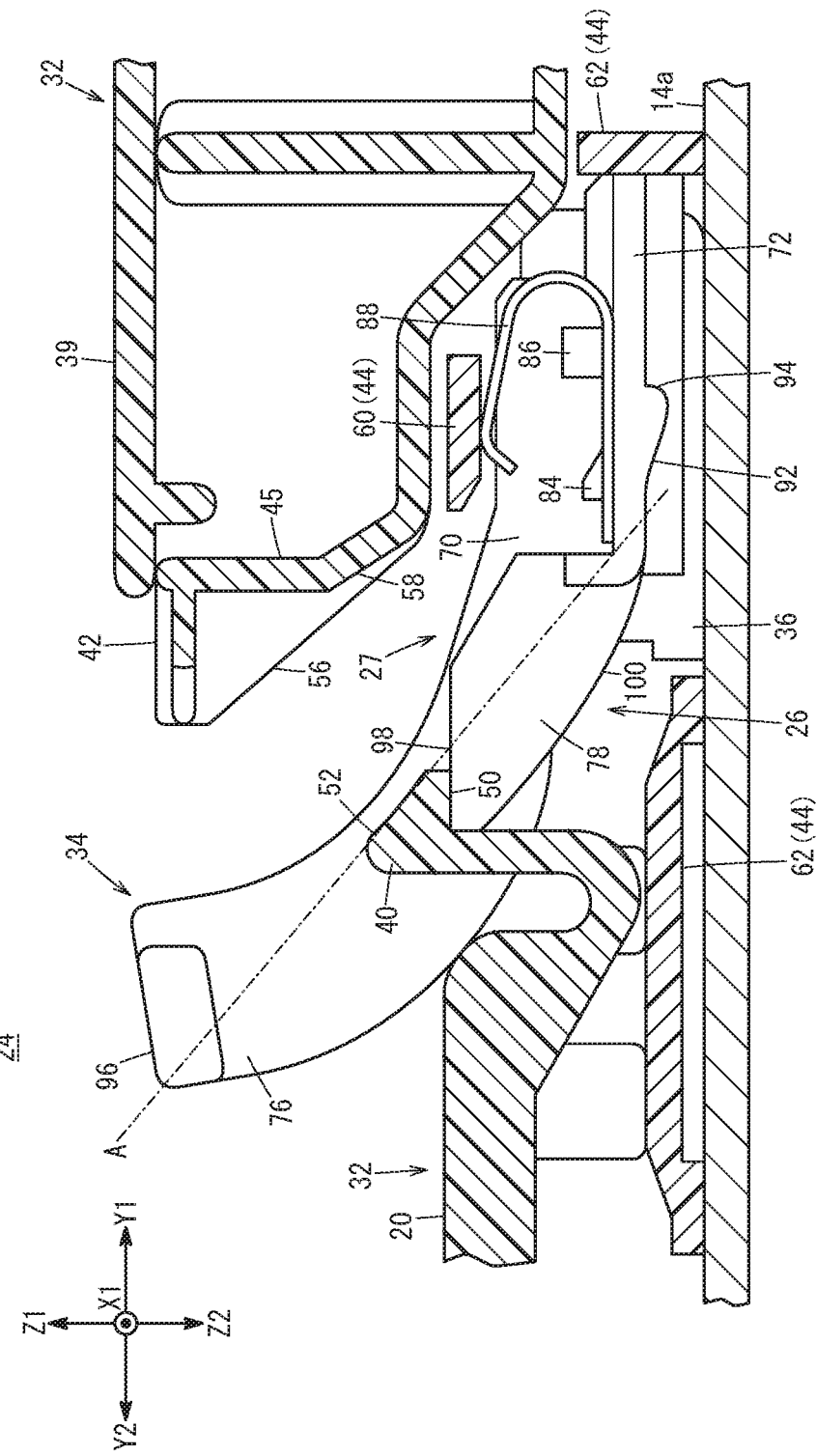
FIG. 2 is a fragmentary sectional view taken along the line II-II in FIG. 1.

FIG. 2 is a fragmentary sectional view in which the temperature detecting device 24 is viewed from the right side. Incidentally, in FIG. 2, a lead wire 104 (refer to FIG. 5) pulled out from the thermistor in the temperature detection unit 36 is omitted from the drawing for visual simplification. The temperature detecting device 24 is equipped with a holder 32 (base) attached to the outer wall 14a of the battery cell 14 (temperature detection object), a case 34 (insert) configured to be inserted into the holder 32 and to be attached to the holder 32 and the outer wall 14a of the battery cell 14, and the temperature detection unit 36 attached to the case 34.

[1.3.1 Holder 32]

Figure 3:
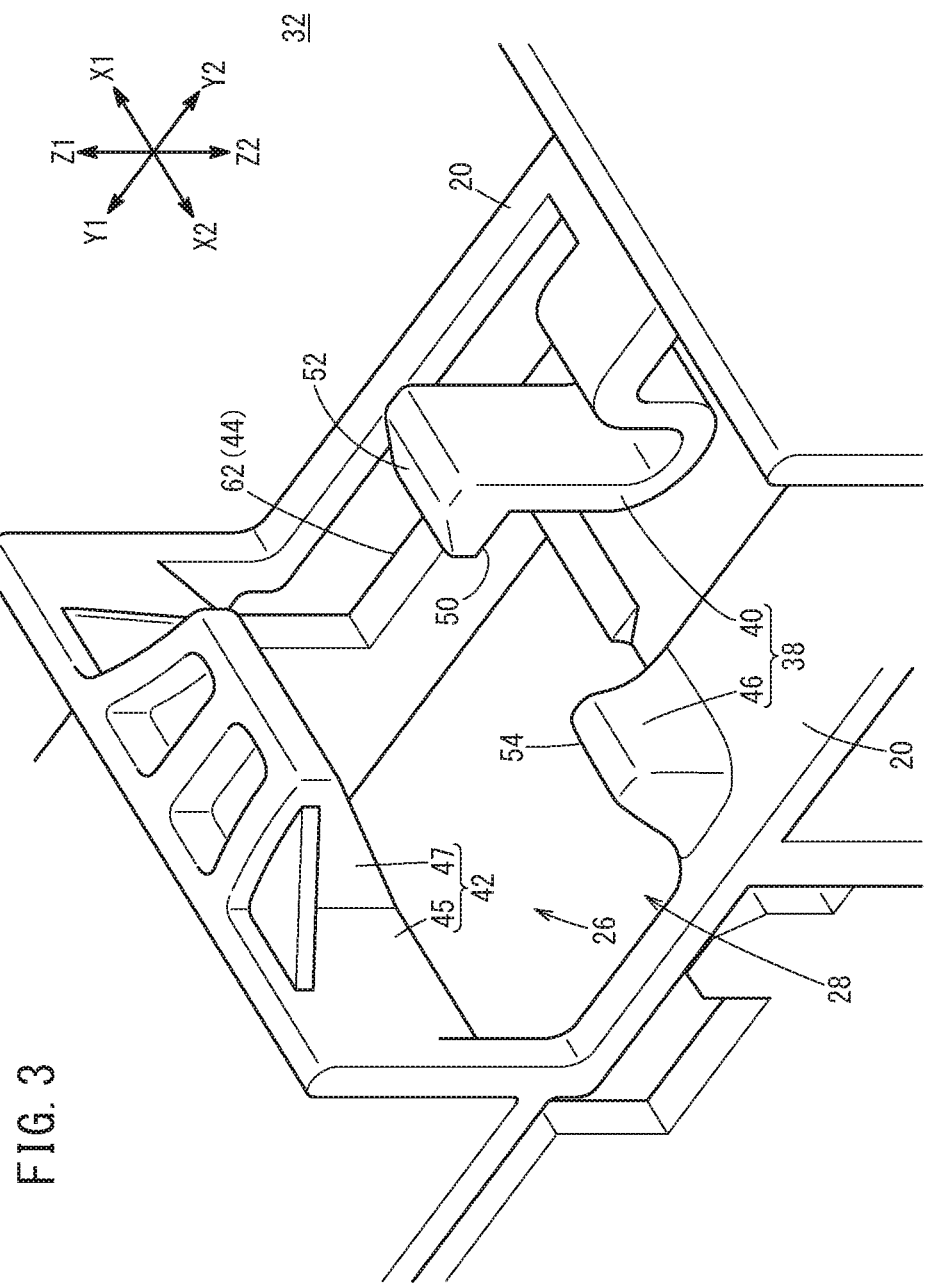
FIG. 3 is a perspective view of a holder.

The holder 32 will be described with reference to FIG. 2 and FIG. 3. FIG. 3 is a perspective view of the holder 32. Incidentally, for making the drawing easy to view, a top plate 39 shown in FIG. 2 is omitted from FIG. 3. The holder 32 is a part of the bus bar plate 20 shown in FIG. 1 and is formed of a resin. The holder 32 has an accommodation portion 44 for accommodating the case 34, the insertion hole 26 for guiding the case 34 inserted from an opening 28 to the outer wall 14a of the battery cell 14, and a first structure 38 and a second structure 42 formed at the periphery of the opening 28. The first structure 38 includes a flexible portion 40 and a first stationary portion 46 which stand in a row in the X direction. The first structure 38 and the second structure 42 are arranged to face each other with the opening 28 therebetween. The first structure 38 is disposed at a higher position than the outer wall 14a (reference position) of the battery cell 14 in the Z1-direction (in a vertically upward direction). The second structure 42 is disposed to be higher than the first structure 38 in the Z1 direction. The axis A of the insertion hole 26 is inclined relative to the Y direction and the Z direction. Thus, the insertion hole 26 extends in an inclined manner from the outer wall 14a of the battery cell 14 to the opening 28.

The flexible portion 40 extends from a starting point at the bus bar plate 20 in the Z2 direction, then is bent in the Z1 direction and extends in the Z1 direction. Further, the flexible portion 40 has a hook-shaped engaging claw portion 50 on a front end side and has a guide surface 52 directed toward the second structure 42, on a back side of the engaging claw portion 50. The guide surface 52 is slanted relative to the Y direction and the Z direction. The flexible portion 40 is low in rigidity because of a structure being bent and extending, and thus has flexibility in the Y2 direction and the X1 direction. When the case 34 is inserted into the insertion hole 26 and is pushed toward the accommodation portion 44, the flexible portion 40 has a function of guiding a first surface 66 (refer to FIG. 5) of the case 34 to the outer wall 14a of the battery cell 14, by abutting on the first surface 66 while being bent in the Y2 direction and the X1 direction.

The first stationary portion 46 shown in FIG. 3 protrudes from the bus bar plate 20 in the Z1 direction. The first stationary portion 46 has a guard surface 54 directed toward the second structure 42. The guard surface 54 is slanted to the Y direction and the Z direction. The first stationary portion 46 is high in rigidity and does not have flexibility because the first stationary portion 46 does not have a bent structure like the flexible portion 40.

The second structure 42 is provided at a position in the Y1 direction relative to the first structure 38. The second structure 42 has a wall portion 45 extending in the Z1 direction and a second stationary portion 47 extending from the wall portion 45 in the Y2 direction. The protruding amount of an upper portion of the second stationary portion 47 is larger than that of a lower portion. The second stationary portion 47 is provided at a center portion in the X direction of the second structure 42. The second stationary portion 47 has a protruding surface 56 directed toward the first structure 38. The protruding surface 56 is almost parallel to the guide surface 52 of the flexible portion 40. An end portion of the protruding surface 56 in the Z1 direction is provided at a position higher than an end portion of the guide surface 52 in the Z1 direction. An end portion of the protruding surface 56 in the Z2 direction is provided at almost the same height as an end portion of the guide surface 52 in the Z2 direction. The length of the protruding surface 56 (the length of the insertion hole 26 in the extending direction) is longer than the length of the guide surface 52. Like the first stationary portion 46, the second stationary portion 47 is high in rigidity and does not have flexibility because the second stationary portion 47 does not have a bent structure.

The first structure 38 and the second structure 42 formed on the holder 32 have a function of preventing a human finger from entering by cooperating with each other when the finger is inserted into the opening 28 and is pushed toward the accommodation portion 44. Details will be described at [4] below.

As shown in FIG. 2, the second structure 42 has first spring abutment portions 58 at opposite ends in the X direction of a lower portion (Z2 direction) of the protruding surface 56. In the case of the present embodiment, the first spring abutment portions 58 are provided at a position slightly advanced in the Y1 direction relative to the protruding surface 56. Further, the slant angle of the first spring abutment portions 58 relative to the Y direction is slightly larger than the slant angle of the protruding surface 56 relative to the Y direction. The second structure 42 is high in rigidity and does not have flexibility like the first stationary portion 46. Further, when the case 34 is inserted into the insertion hole 26 and is pushed toward the accommodation portion 44, the second structure 42 has a function of guiding a second surface 68 to the upper portion of the accommodation portion 44 by abutting on the second surface 68 (refer to FIG. 4) of the case 34.

The accommodation portion 44 has second spring abutment portions 60 and a position regulation portion 62. The second spring abutment portions 60 are provided between the outer wall 14a of the battery cell 14 and the second structure 42. The positions in the X direction of the second spring abutment portions 60 are the same as the positions in the X direction of the first spring abutment portions 58. The position regulation portion 62 regulates the positions of a Y direction end portion and an X direction end portion of the case 34. The position regulation portion 62 is attached to the outer wall 14a of the battery cell 14.

[1.3.2 Case 34]

The case 34 will be described with reference to FIG. 2, FIG. 4 and FIG. 5. FIG. 4 is a perspective view showing a back side, an upper side, and a right side of the case 34. FIG. 5 is a perspective view showing a front side, a bottom side, and a left side of the case 34. Among the surfaces of the case 34, the surface in the Z2 direction shown mainly in FIG. 5 is defined as the first surface 66, and the surface in the Z1 direction shown mainly in FIG. 4 is defined as the second surface 68. The second surface 68 corresponds to a back side of the first surface 66. The case 34 is formed of a resin. The case 34 has a base portion 70, a spring holder (spring shoe portion) 72 extending from the base portion 70 in the X1 direction, a spring holder (spring shoe portion) 74 extending in the X2 direction, a grip portion 76 extending from the base portion 70 in a direction which has a Y2 direction component and a Z1 direction component, and an engagement receiving portion 78 provided at a position which is spaced from the spring holder 72 in the Y2 direction and from the grip portion 76 in the X1 direction.

As shown in FIG. 5, on the first surface 66 side, the base portion 70 includes a gutter 80 which has the same or complementary shape to a portion of the outer peripheral surface of the temperature detection unit 36 and which is formed along the Y direction. The temperature detection unit 36 is attached to the gutter 80. In this embodiment, the temperature detection unit 36 is press-fitted from an opening of the gutter 80, which is formed at an end portion of the gutter 80 in the Y2 direction. The base portion 70 accommodates the temperature detection unit 36 in the state that a part of the temperature detection unit 36 is exposed and protruded from the first surface 66 side. Furthermore, in the present embodiment, as shown in FIG. 2 and FIG. 4, the base portion 70 accommodates the temperature detection unit 36 in the state that a front end portion of the temperature detection unit 36 is exposed from the second surface 68 side.

As shown in FIG. 4, the spring holder 72 has a first spring fixing portion 84 and a second spring fixing portion 86 on the second surface 68 side. The first spring fixing portion 84 protrudes from the spring holder 72 in the Z1 direction, and the second spring fixing portion 86 protrudes from the base portion 70 in the X1 direction (in the X2 direction in the case of spring holder 74). Then, a twofold leaf spring 88 is attached on the second surface 68 side of the spring holder 72 with its bent portion directed in the Y1 direction. The leaf spring 88 is formed with a through hole 90. When the leaf spring 88 is inserted into a gap between the spring holder 72 and the second spring fixing portion 86 and further, the first spring fixing portion 84 is inserted into the through hole 90, the movement of the leaf spring 88 in the X and Y directions is restricted by the first spring fixing portion 84 and the movement of the leaf spring 88 in the Z direction is restricted by the second spring fixing portion 86. Therefore, the leaf spring 88 is fixed to the spring holder 72. The spring holder 74 has a structure symmetrical to the spring holder 72. For this reason, the description of the spring holder 74 will be omitted. In this case, the second spring fixing portion 86 at the spring holder 74 protrudes from the base portion 70 in the X2 direction.

As shown in FIG. 2, in the state that the case 34 is attached to the holder 32, the leaf springs 88 are interposed between the second surface 68 (refer to FIG. 4) sides of the spring holders 72, 74 and the second spring abutment portions 60 to press the base portion 70 on the outer wall 14a side of the battery cell 14. In this state, the temperature detection unit 36 exposed from the base portion 70 in the Z2 direction is pressed on the outer wall 14a of the battery cell 14. Incidentally, the leaf springs 88 may be substituted by other elements in which elastic members such as rubbers, coil springs or the like are sandwiched by plate members.

As shown in FIG. 5, the spring holders 72, 74 respectively have guide receiving portions 92 on the first surface 66 side. Each of the guide receiving portions 92 has a slope surface which protrudes gradually in the Z2 direction as the slope surface advances from the Y2 direction in the Y1 direction, and also has a flat surface which extends in parallel to the Y direction. A guide receiving end portion 94 of each of the guide receiving portions 92 in the Y1 direction takes a shape rounded about an axis extending in the X direction. As this shape, an arc surface is formed which corresponds to about 90 degrees of a cylindrical column having the axis parallel to the X direction.

As shown in FIG. 2, in the state that the case 34 is attached to the holder 32, the grip portion 76 extends from the starting point at the base portion 70 in a direction away from the battery cells 14, and is curved to go away from the battery cell 14 toward a grip end portion 96. That is, the grip portion 76 extends in a direction having a Y2 direction component and a Z1 direction component. Furthermore, in the direction in which the grip portion 76 extends, the Y2 direction component becomes larger and the Z1 direction component becomes smaller toward the base portion 70. Further, toward the grip end portion 96, the Y2 direction component becomes smaller and the Z1 direction component becomes larger.

As shown in FIG. 2 and FIG. 4, the engagement receiving portion 78 has an engagement surface 98 in the Z1 direction. The engagement surface 98 abuts on the engaging claw portion 50 of the flexible portion 40 in a state in which the case 34 is attached to the holder 32. That is, the engagement receiving portion 78 is engaged with the engaging claw portion 50. In a state in which the engagement surface 98 abutting on the engaging claw portion 50, the engagement receiving portion 78 is prevented from being moved in the Y2 direction and the Z1 direction.

The engagement receiving portion 78 has a slope 100 on the first surface 66 side. The slope 100 is an almost arc shape having its axis extending in the X direction. The slope 100 abuts on the guide surface 52 of the flexible portion 40 when the case 34 is inserted into the holder 32.

[1.3.3 Temperature Detection Unit 36]

The temperature detection unit 36 will be described with reference to FIG. 5. The temperature detection unit 36 is configured to enclose a thermosensitive element (a thermistor, a thermocouple or the like) not shown in an aluminum pipe 102 by the use of potting resin in a sealing manner. The potting resin includes urethane resin for example as a chief agent. The lead wire 104 is pulled out from the thermosensitive element. The lead wire 104 is connected to a temperature detection circuit, not shown. Incidentally, the lead wire 104 shown in FIG. 4 and FIG. 5 includes two lead wires inside. Incidentally, the lead wire 104 is omitted from FIG. 2 and FIG. 6A to FIG. 6C, FIG. 7A, FIG. 7B and FIG. 8 to which reference will be made in the following description, for these drawings easy to view.

2 ATTACHING OPERATION OF CASE 34 TO HOLDER 32

Figure 6A:
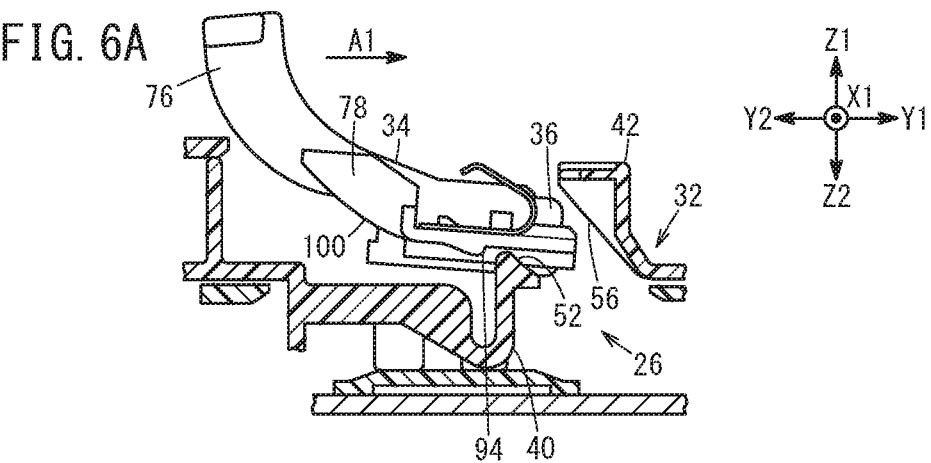
FIGS. 6A to 6C are explanatory views for explaining a series of operations performed when the case is attached to the holder.
Figure 6B:
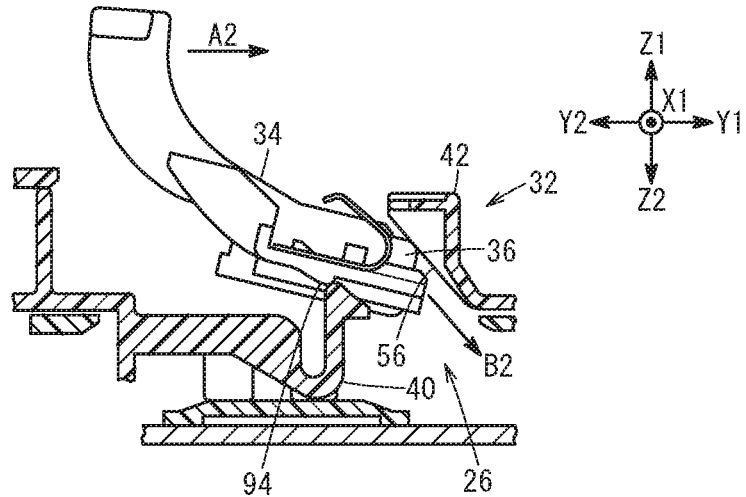

The attaching operation of the case 34 to the holder 32 will be described with reference to FIG. 6A to FIG. 6C, FIG. 7A and FIG. 7B. FIG. 6A to FIG. 6C, FIG. 7A and FIG. 7B each show a state that the holder 32 and the case 34 are viewed from the same direction (the X1 direction) as FIG. 2. In the attaching operation, the worker grips the grip portion 76 and inserts the case 34 into the insertion hole 26 of the holder 32. For example, as shown by the arrow A1 in FIG. 6A, the worker pushes the case 34 toward the insertion hole 26 from the Y2 direction to the Y1 direction. Thereupon, the guide receiving end portion 94 abuts on the flexible portion 40. Because the outer peripheral surface of the guide receiving end portion 94 is an arc surface, the guide receiving end portion 94 gets over the flexible portion 40. Then, as shown in FIG. 6B, the end portion of the temperature detection unit 36 exposed from the base portion 70 comes into abutment on the protruding surface 56.

Figure 6C:
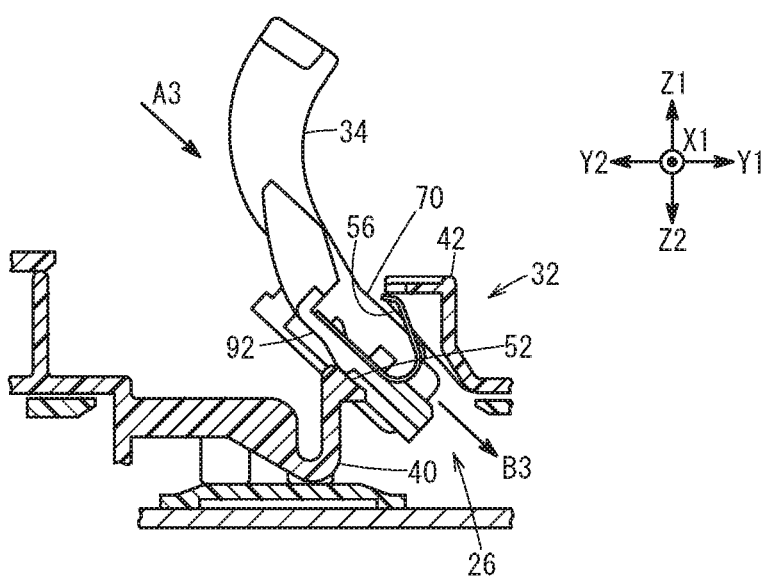

As shown by the arrow A2 in FIG. 6B, the worker further pushes the case 34 from the Y2 direction in the Y1 direction. Then, the case 34 is pivoted about the guide receiving end portion 94, and the front end portion of the temperature detection unit 36 is moved in the arrow B2 direction along the protruding surface 56 of the second structure 42. As this operation proceeds, the front end portion of the base portion 70 abuts on the protruding surface 56 as shown in FIG. 6C. The base portion 70 is moved in the arrow B3 direction along the protruding surface 56.

As shown by the arrow A3 in FIG. 6C, when the worker pushes the case 34 toward the inside of the insertion hole 26, the case 34 is moved in the arrow B3 direction. At this time, the base portion 70 is guided by the protruding surface 56 of the second structure 42. Further, the guide receiving portion 92 is guided by the guide surface 52 of the flexible portion 40. In this manner, the flexible portion 40 and the second structure 42 regulate the insertion initial position and the insertion direction of the case 34.

Figure 7A:
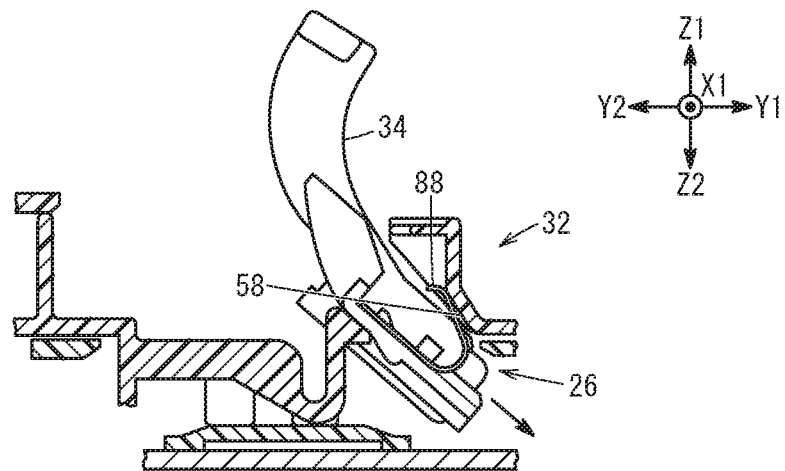
FIGS. 7A and 7B are explanatory views for explaining the series of operations performed when the case is attached to the holder.
Figure 7B:
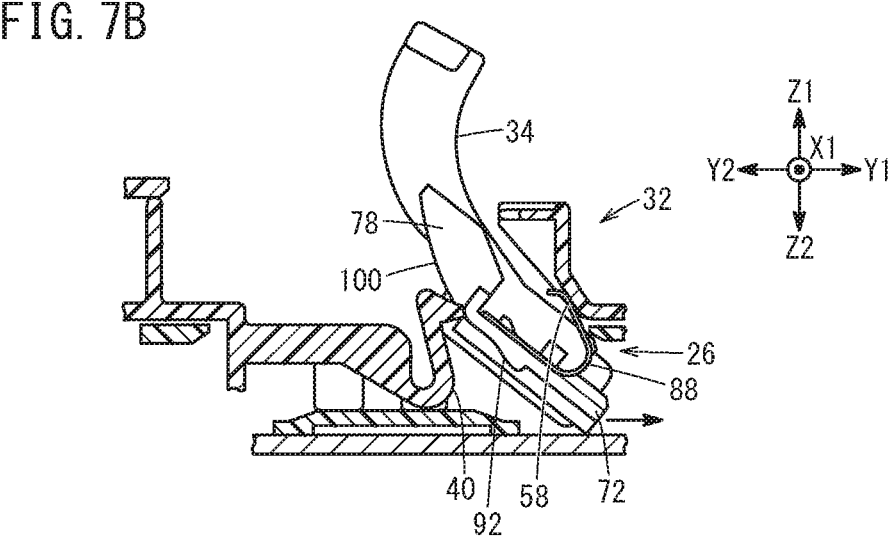

When the worker pushes the case 34 from the state shown in FIG. 6C toward the inside of the insertion hole 26, the leaf springs 88 abut on the first spring abutment portions 58 as shown in FIG. 7A. Then, the pressing forces of the leaf springs 88 act on the case 34 from the second surface 68 side toward the first surface 66 side. As the worker pushes the case 34 toward the inside of the insertion hole 26, the pressing force of the leaf springs 88 increases. At this time, as shown in FIG. 7B, the flexible portion 40 is bent in the Y2 direction and the X1 direction by being pressed by the guide receiving portion 92 of the spring holder 72 or by the slope 100 of the engagement receiving portion 78. Therefore, the movement direction of the base portion 70 comes close to the Y direction. When the end portion of the base portion 70 abuts on the outer wall 14a of the battery cell 14, the movement direction of the base portion 70 comes further closer to the Y direction.

Finally, the state shown in FIG. 2 is reached. In this state, the positions in the X and Y directions of the temperature detection unit 36 are regulated by the position regulation portion 62 of the holder 32. Further, the temperature detection unit 36 is pressed on the outer wall 14a of the battery cell 14 by the leaf springs 88 abutting on the second spring abutment portions 60. Furthermore, the engagement receiving portion 78 of the case 34 is engaged by the engaging claw portion 50 of the holder 32. That is, the movements of the case 34 in the Z1 direction and the Y2 direction are restricted. In this way, the case 34 is attached to the holder 32, whereby the temperature detection unit 36 is attached to the outer wall 14a of the battery cell 14.

3 FORCES EXERTED ON CASE 34

Figure 8:
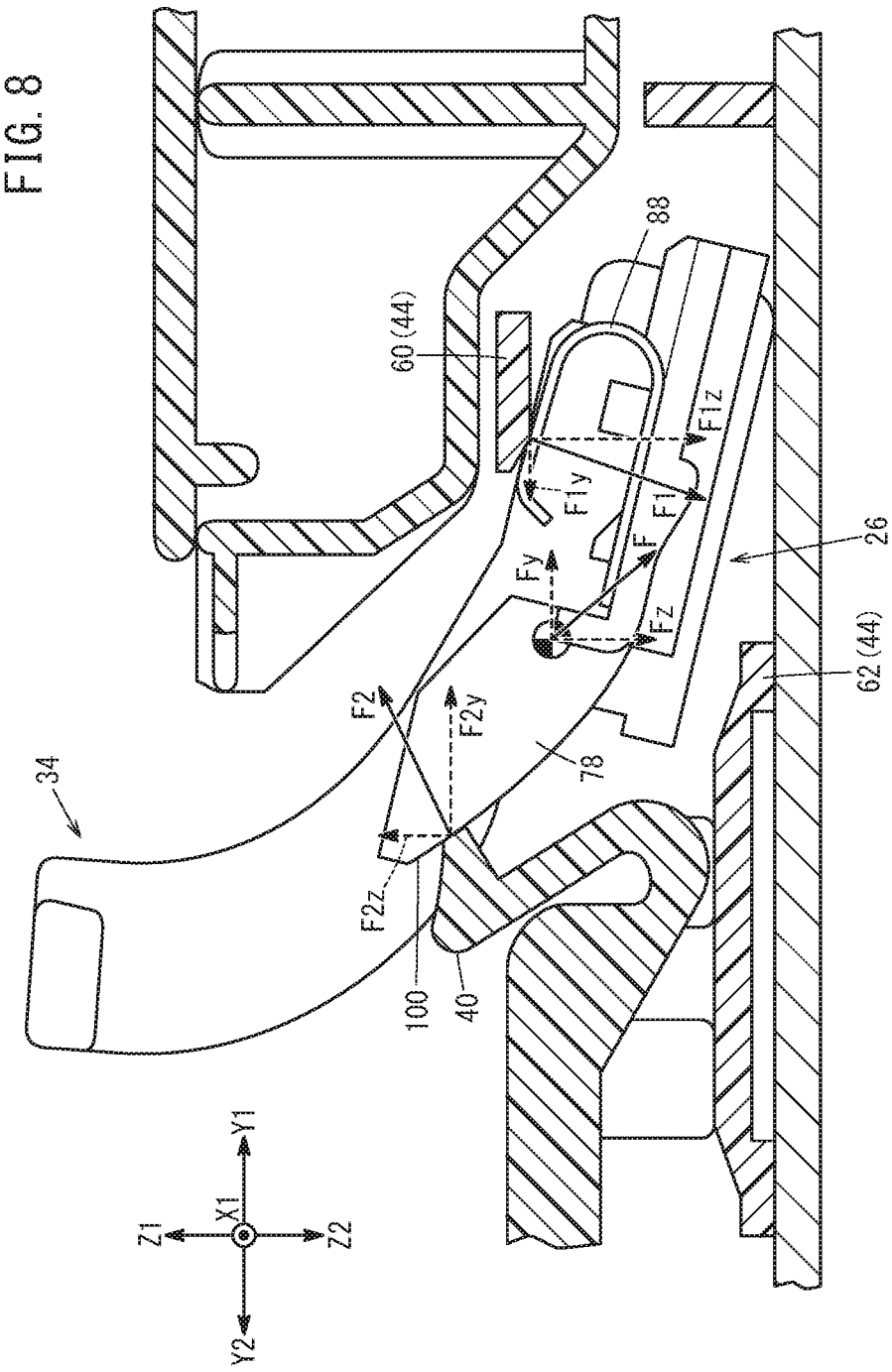
FIG. 8 is a view showing forces acting on the case.

The temperature detecting device 24 is configured so that when a pushing amount of the case 34 into the insertion hole 26 of the holder 32 reaches a predetermined amount, the case 34 is moved automatically to a final attaching position. The operation will be described with reference to FIG. 8. FIG. 8 shows forces exerted on the case 34.

When the leaf springs 88 abut on the second spring abutment portions 60, a spring load F1 is generated by the leaf springs 88. The spring load F1 has a component F1$y$ in the Y direction and a component F1$z$ in the Z direction. On the other hand, when the flexible portion 40 is bent in the Y2 direction by being pressed by the slope 100 of the engagement receiving portion 78, a claw load F2 corresponding to a stress of the flexible portion 40 is generated. The claw load F2 has a component F2y in the Y direction and a component F2z in the Z direction.

The component F1y of the spring load F1 in the Y direction and the component F2y of the claw load F2 in the Y direction are mutually opposite in direction, and the component F1z of the spring load F1 in the Z direction and the component F2z of the claw load F2 in the Z direction are mutually opposite in direction. Where a force added to the case 34 by the worker is neglected, a resultant force F of the spring load F1 and the claw load F2 is exerted on the case 34. The resultant force F has a component Fy (=F1y+F2y) in the Y direction and a component Fz (=F1z+F2z) in the Z direction.

When the push-in amount of the case 34 reaches a predetermined amount, the component Fy of the resultant force F in the Y direction is directed in the Y1 direction, and the component Fz in the Z direction is directed in the Z2 direction. In this state, the resultant force F that guides the base portion 70 into the accommodation portion 44 acts on the case 34. Thus, the case 34 is automatically moved to the final attaching position. On the contrary, where the push-in amount of the case 34 is insufficient, a force F' that pushes the case 34 out of the insertion hole 26 acts on the case 34.

In this way, the temperature detecting device 24 is of the configuration that the component F1y of the spring load F1 in the Y direction and the component F2y of the claw load F2 in the Y direction become mutually opposite in direction, and that the component F1z of the spring load F1 in the Z direction and the component F2z of the claw load F2 in the Z direction become mutually opposite in direction. Further, the configuration is such that as the push-in amount of the case 34 increases, the component F2y of the claw load F2 in the Y direction exceeds the component F1y of the spring load F1 in the Y direction to generate the component Fy of the resultant force F in the Y direction, and the component F1z of the spring load F1 in the Z direction exceeds the component F2z of the claw load F2 in the Z direction to generate the component Fz of the resultant force F in the Z direction.

4 LOAD-BEARING FUNCTIONS OF FIRST STRUCTURE 38 AND SECOND STRUCTURE 42

Figure 9A:
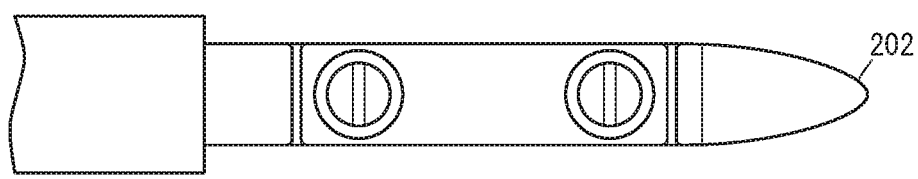
FIG. 9A is a plan view of a test finger.
Figure 9B:
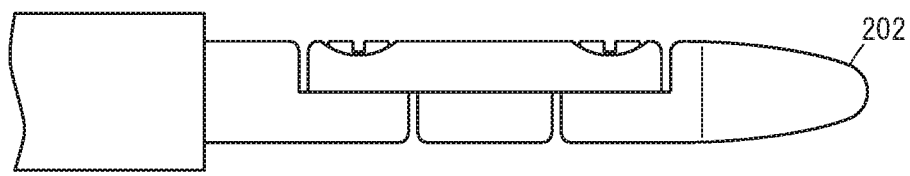
FIG. 9B is a side view of the test finger.

As mentioned above, the first structure 38 and the second structure 42 have a function of cooperatively preventing the entering of the human finger when the human finger is inserted from the opening 28 and is pushed toward the accommodation portion 44. Specifically, the first structure 38 and the second structure 42 are made to have such strength and structure that when a test finger 200 shown in FIG. 9A and FIG. 9B is inserted from the opening 28 and a predetermined load (10 N, for example) is imposed, the first structure 38 and the second structure 42 are not damaged and an end portion 202 of the test finger 200 does not contact the outer wall 14a of the battery cell 14. The test finger 200 is prescribed by the IEC (International Electrotechnical Commission) Standard (IEC60529).

The bus bar plate 20 used in the temperature detecting device 24 includes a plurality of load distribution portions formed at the periphery of the opening 28 of the insertion hole 26, to distribute a load generated upon contact with a foreign matter that is moved toward the battery cell 14 through the insertion hole 26, and to release the load to the peripheral structure of the opening 28. The load distribution portions are constituted by the first structure 38, the second structure 42 and/or peripheral structures therearound. Further, the flexible portion 40 and the first stationary portion 46 of the first structure 38 and the second stationary portion 47 of the second structure 42 are arranged with such intervals as to simultaneously contact the outer surface of the test finger 200 which enters the insertion hole 26 from the opening 28. Furthermore, the heights in the Z1 direction of the first structure 38 and the second structure 42 are set so that when the outer surface of the test finger 200 contacts the first structure 38 and the second structure 42, the end portion 202 of the test finger 200 does not contact the outer wall 14a of the battery cell 14.

Figure 10:
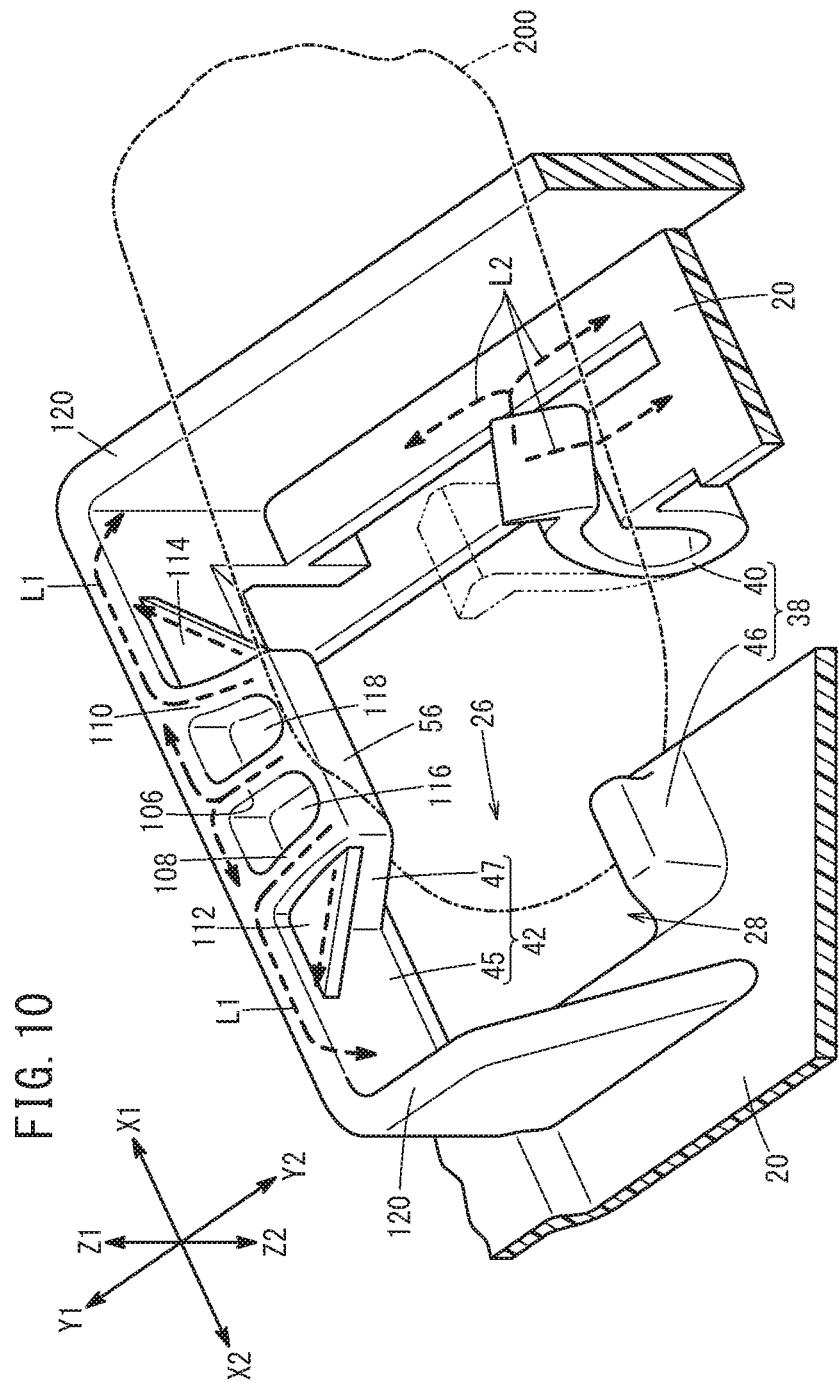
FIG. 10 is an explanatory view for explaining load paths in a flexible portion and a second stationary portion.

As shown in FIG. 10, at the second stationary portion 47 of the second structure 42, holes 116, 118 for lightening each having a bottom in the Z2 direction are juxtaposed along the X direction. A rib 106 parallel to the Z-Y plane and perpendicular to the wall portion 45 is formed between the hole 116 and the hole 118. Further, a rib 108 parallel to the rib 106 is formed on the X2 direction side of the hole 116, and a rib 110 parallel to the rib 106 is formed on the X1 direction side of the hole 118. The protruding surface 56 is located at end portions of the respective ribs 106, 108, 110 in the Y2 direction.

Figure 11:
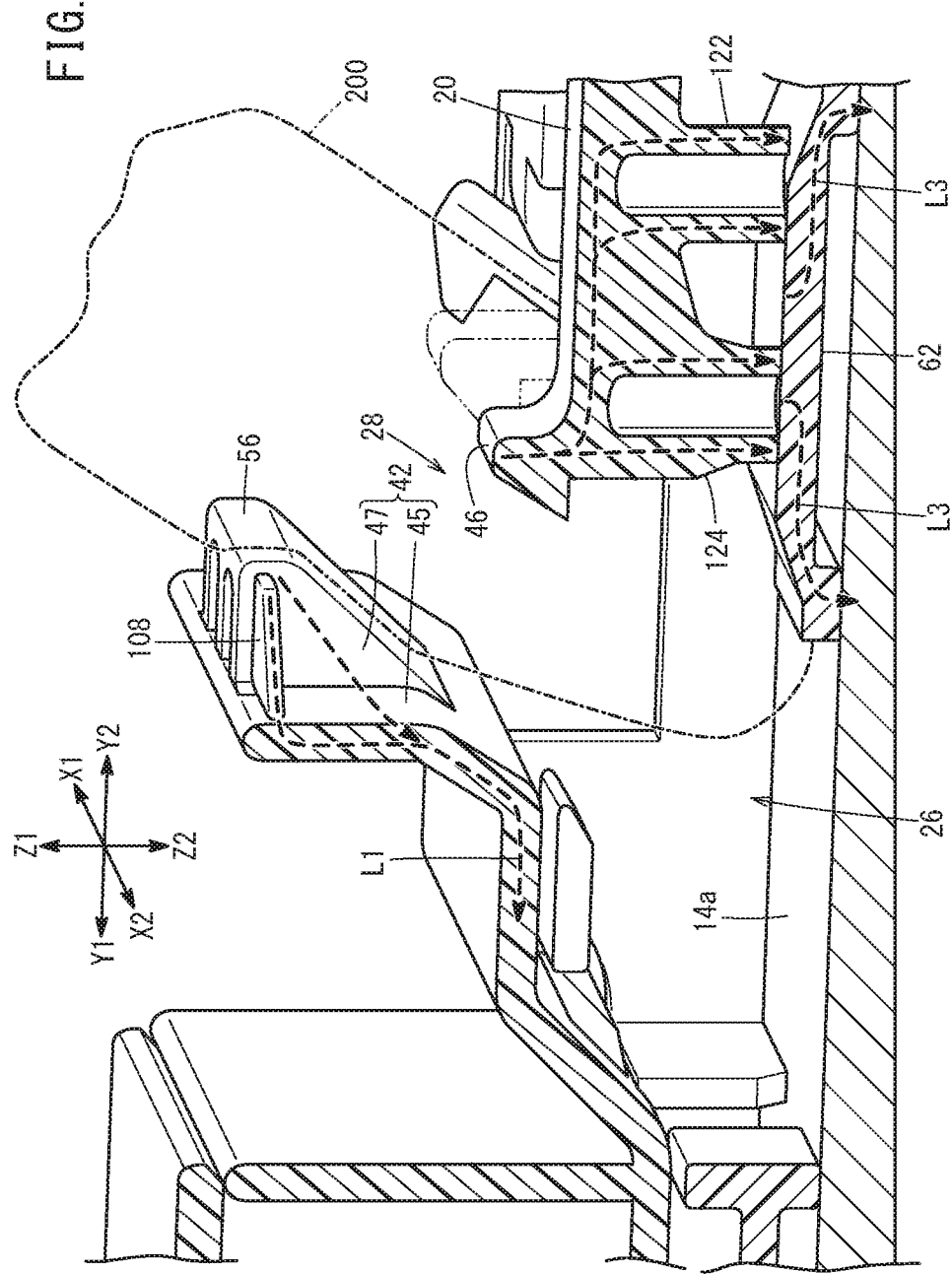
FIG. 11 is an explanatory view for explaining load paths in a first stationary portion and the second stationary portion.

As shown in FIG. 10 and FIG. 11, the second structure 42 is formed with a rib 112 parallel to the X-Y plane and perpendicular to the rib 108 and the wall portion 45, and is also formed with a rib 114 parallel to the X-Y plane and perpendicular to the rib 110 and the wall portion 45.

As shown in FIG. 10, the bus bar plate 20 is disposed in the Y2 direction and the X1 direction of the flexible portion 40 of the first structure 38. The flexible portion 40, when increased in flexure or bent amount in the Y2 direction and/or the X1 direction, is brought into abutment on the bus bar plate 20 to be restrained from being further bent. In an event that the case 34 is inserted into the insertion hole 26, the flexible portion 40 is bent but does not abut on the bus bar plate 20. On the other hand, when the case 34 is pushed from the opening 28 into the insertion hole 26 with a predetermine load, the flexible portion 40 abuts on the bus bar plate 20.

As shown in FIG. 11, tubular leg portions 122, 124 which extend toward the outer wall 14a of the battery cell 14 through the bus bar plate 20 are formed at a lower portion of the first stationary portion 46 of the first structure 38. Furthermore, the respective leg portions 122, 124 are connected to the position regulation portion 62 which abuts on the outer wall 14a of the battery cell 14.

Here, description will be made regarding load transfer paths (load paths) for loads generated in the first structure 38, the second structure 42, and the peripheral structures. When the test finger 200 is about to enter the insertion hole 26 from the opening 28, the test finger 200 comes into abutments on the first structure 38 and the second structure 42. When the test finger 200 is pushed into the insertion hole 26 with a predetermined load, the load is distributed to the first structure 38 and the second structure 42. Furthermore, a plurality of load transfer paths (load paths) are formed in the first structure 38 and the second structure 42 as follows.

As shown in FIG. 10 and FIG. 11, when the outer surface of the test finger 200 abuts on the protruding surface 56 of the second stationary portion 47, the load added from the test finger 200 is transmitted to the bus bar plate 20 by way of the load paths indicated by the arrows L1. That is, the load exerted on the second stationary portion 47 is distributed to the ribs 106, 108, 110 parallel to the Y-Z plane and the ribs 112, 114 parallel to the X-Y plane and is transmitted to the wall portion 45 extending in the X-Z plane. Furthermore, the load transmitted to the wall portion 45 is transmitted to the bus bar plate 20.

As shown in FIG. 10, when the outer surface of the test finger 200 abuts on the flexible portion 40, the flexible portion 40 is bent in X1 direction and the Y2 direction to abut on the bus bar plate 20 in the respective directions. In this state, the load imposed from the test finger 200 is transmitted to the bus bar plate 20 by way of the load paths indicated by the arrow lines L2. That is, the load exerted on the flexible portion 40 is distributed to abutment portions of two places including the flexible portion 40 and the bus bar plate 20 to be transmitted to the bus bar plate 20.

As shown in FIG. 11, when the outer surface of the test finger 200 abuts on the first stationary portion 46, the load imposed from the test finger 200 is transmitted to the battery cell 14 by way of load paths indicated by the arrow lines L3. That is, the load exerted on the first stationary portion 46 is distributed to the leg portions 122, 124 through the bus bar plate 20 and is transmitted to the position regulation portion 62 extending in the X-Y plane. Furthermore, the load transmitted to the position regulation portion 62 is transmitted to the battery cell 14.

Figure 12:
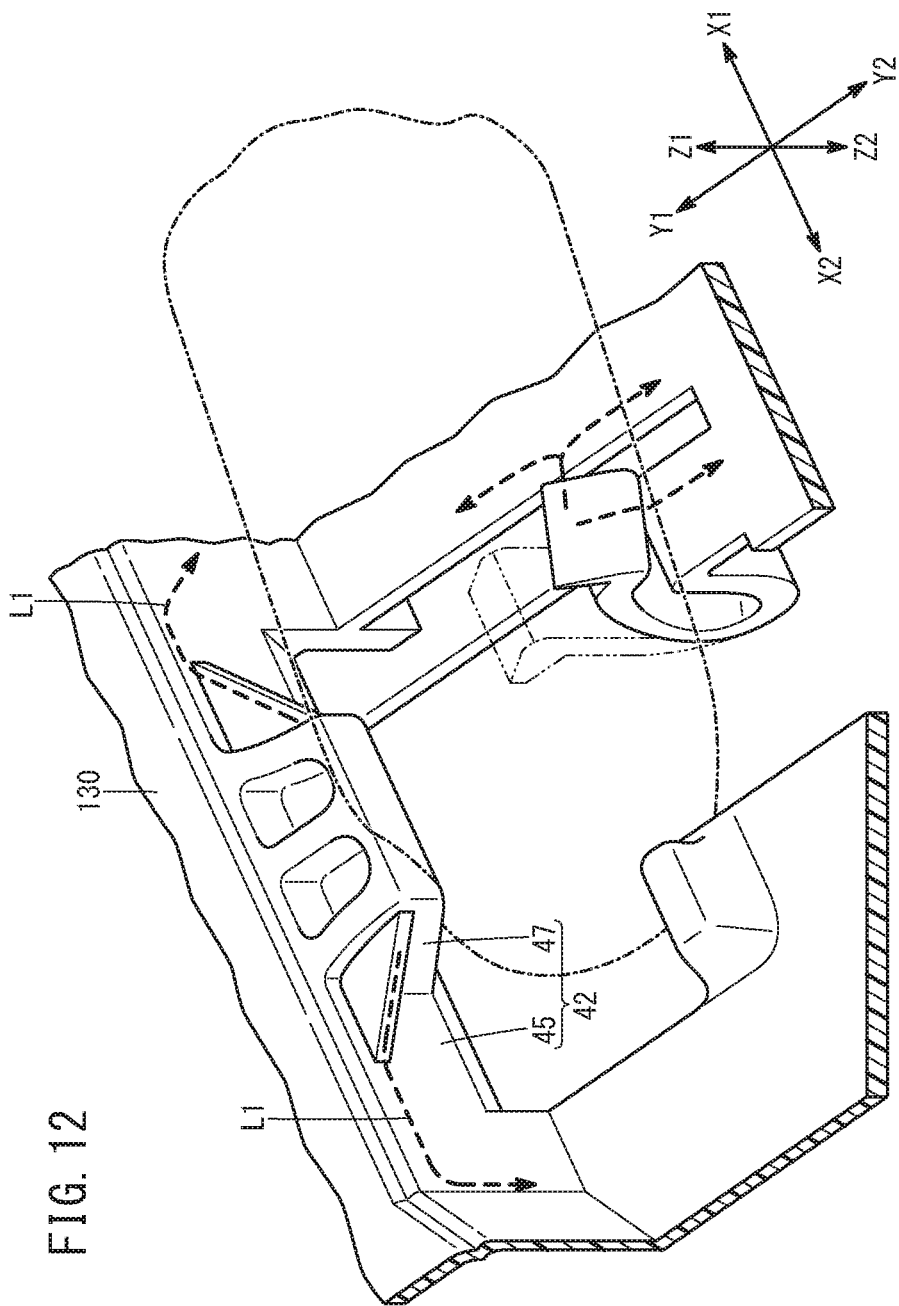
FIG. 12 is a perspective view of a holder in another form.

Incidentally, the peripheral structure of the insertion hole 26 of the holder 32 may take various forms. For example, as shown in FIG. 10, the opposite ends of the wall portion 45 of the second structure 42 in the X direction may be connected to respective ends of plates 120, 120 extending in the Y2 direction. Further, as shown in FIG. 12, an upper end of the wall portion 45 of the second structure 42 may be connected to an end of a plate 130 extending in parallel to the X-Y plane. Further, as shown in FIG. 13, opposite ends of the wall portion 45 of the second structure 42 in the X direction may be connected to respective ends of plates 140, 140 extending in the Y1 direction, and furthermore, other ends of the plates 140, 140 may be connected to a plate 142 extending in parallel to the X-Z plane.

Further, in the present embodiment, the second stationary portion 47 has the three ribs 106, 108, 110 parallel to the Y-Z plane and the two ribs 112, 114 parallel to the X-Y plan. However, the number of the ribs is not limited to the number in the present embodiment as long as the number is plural. Further, in the present embodiment, the two leg portions 122, 124 are formed at a lower portion of the first stationary portion 46. However, the number of the leg portions is not limited to the number in the present embodiment as long as the number is plural.

5 CONCLUSION OF PRESENT EMBODIMENT

The temperature detecting device 24 according to the present embodiment is equipped with the battery cell 14 (temperature detection object), the holder 32 (base) covering the outer wall 14a of the battery cell 14, the case 34 (insert) configured to be inserted into the insertion hole 26 of the holder 32 and to be guided to the outer wall 14a of the battery cell 14, and the temperature detection unit 36 attached to the case 34. The case 34 has the first surface 66 located on the battery cell 14 side in the attached state that the case 34 is attached to the holder 32, the second surface 68 located on the back side of the first surface 66, the base portion 70 configured to accommodate the temperature detection unit 36 with a part of the temperature detection unit 36 exposed from the first surface 66 side, and the grip portion 76 extending from the starting point at the base portion 70 in the directions (in Y2 direction and Z1 direction) away from the battery cell 14 in the aforementioned attached state. The holder 32 has the accommodation portion 44 configured to accommodate the base portion 70 with a part of the temperature detection unit 36 held in contact with the battery cell 14 in the aforementioned attached state, the flexible portion 40 (the first structure 38) configured to guide the first surface 66 toward the battery cell 14 at the time of the insertion of the case 34, and the second structure 42 configured to guide the second surface 68 toward the upper portion of the accommodation portion 44 at the time of the insertion of the case 34. With this configuration, when the case 34 is inserted into the holder 32 to become the aforementioned attached state, the base portion 70 is positioned along the battery cell 14. Because the push-in direction and the insertion direction can be made different in this manner, a working property can be improved in attaching the temperature detection unit 36 relative to the battery cell 14. Further, because it is possible to attach the temperature detection unit 36 to the battery cell 14 by simply inserting the case 34 into the holder 32 from the outside of the holder 32, the working property can be improved in attaching the temperature detection unit 36 relative to the battery cell 14.

The flexible portion 40 and the second structure 42 are arranged in a face-to-face relation and regulate the insertion initial position and/or the insertion direction of the case 34. With this configuration, even when the case 34 is inserted into the holder 32 at an insertion angle different from a regular insertion angle as shown in FIG. 6A, the insertion initial position and the insertion direction are regulated, and hence, it is possible to guide the case 34 to a correct insertion posture.

The holder 32 has the engaging claw portion 50 configured to engage the case 34 in the aforementioned attached state. The case 34 has the engagement receiving portion 78 configured to be engaged with the engaging claw portion 50 in the aforementioned attached state, at least on one side of the base portion 70 in the width direction (X direction) perpendicular to the insertion direction. With this configuration, since the engaging claw portion 50 and the engagement receiving portion 78 are arranged at the end portion in the width direction, it becomes easy for the worker to visually confirm the engagement state of the case 34 relative to the holder 32.

The flexible portion 40 is configured to guide the engagement receiving portion 78 while being bent at the time of the insertion of the case 34. With this configuration, a stable guiding operation becomes possible because the base portion 70 is guided flexibly.

The case 34 has the leaf springs 88 (elastic members) that are interposed between the second surface 68 and the inner surface on the upper side of the accommodation portion 44 in the aforementioned attached state to press the base portion 70 toward the battery cell 14. With this configuration, since the temperature detection unit 36 is made to closely contact the battery cell 14, it is possible to improve the temperature detection accuracy and to provide the second structure 42 with the guide receiving function (to guide the leaf springs 88) at the time of insertion.

The grip portion 76 is curved to go away from the battery cell 14 as the grip portion 76 extends in a direction to the end thereof in the aforementioned attached state. With this configuration, the grip portion 76 becomes easy to grip because the grip portion 76 is away from the holder 32. Thus, it becomes easy to exert the force on the case 34 in the insertion direction.

Further, the temperature detecting device 24 is equipped with the insertion hole structure configured to guide the case 34 (insert) which is inserted into the holder 32 (base) covering the outer wall 14a of the battery cell 14 (attached object), to the outer wall 14a of the battery cell 14 from the outside of the holder 32. In this insertion hole structure, at the periphery of the opening 28 of the insertion hole 26, the plurality of load distribution portions, specifically the first structure 38 and the second structure 42 are formed, which are configured to distribute and release the load generated upon contact with a foreign matter which is about to enter through the insertion hole 26 toward the battery cell 14. With this configuration, by the plurality of load distribution portions formed at the periphery of the opening 28 of the insertion hole 26, it is possible to restrain the peripheral portion of the opening 28 from being damaged at the time of the insertion of the foreign matter.

The first structure 38 and the second structure 42 have a strength capable of preventing the test finger 200 from entering upon abutment on the same and withstand the load generated upon abutment when the test finger 200 with a predetermined load imposed thereon is about to enter the battery cell 14 side from the opening 28. With this configuration, it is possible to satisfy the test conditions under the IEC.

The first structure 38 and the second structure 42 have the plurality of load transfer paths (the arrow lines L1, L2 and L3). With this configuration, it is possible to distribute the load further efficiently and to restrain the peripheral portion of the opening 28 from being damaged at the time of the insertion of a foreign matter.

The first structure 38 and the second structure 42 face each other through the opening 28. With this configuration, by the face-to-face structure, it is possible to distribute the load efficiently and to restrain the peripheral portion of the opening 28 from being damaged at the time of the insertion of a foreign matter.

If the outer wall 14a of the battery cell 14 is taken as a reference position, the first structure 38 is disposed at a position in the Z1 direction (in the vertically upward direction) with respect to the reference position. The second structure 42 is disposed at a position beyond (more upward than) the first structure 38 in the Z1 direction. With this configuration, it is possible to distribute in different directions the load exerted on the first structure 38 and the load exerted on the second structure 42, and as a result, it is possible to restrain the peripheral portion of the opening 28 from being damaged at the time of the insertion of a foreign matter.

If the outer wall 14a of the battery cell 14 is taken as a reference position, the first structure 38 has the first stationary portion 46 protruding in the Z1 direction (in the vertically upward direction) with respect to the reference position. The second structure 42 has the wall portion 45 extending in the Z1 direction with respect to the reference position and the second stationary portion 47 protruding from the wall portion 45 in the direction in which the first structure 38 is located, and including the upper portion that is larger in protruding amount than the lower portion. With this configuration, it becomes easy to guide the case 34 to the insertion hole 26.

The second stationary portion 47 has the protruding surface 56 (end portion) directed toward the first structure 38 and the plurality of ribs 106, 108, 110, 112, 114 formed between the protruding surface 56 and the wall portion 45. With this configuration, it is possible to distribute the load and hence, to increase the strength of the second stationary portion 47.

The plurality of ribs 106, 108, 110, 112, 114 extend in the direction perpendicular to the wall portion 45. Further, the ribs 106, 108, 110 (some ribs) are perpendicular to the ribs 112, 114 (other ribs). With this configuration, it is possible to further increase the strength of the second stationary portion 47.

The first stationary portion 46 has the plurality of leg portions 122, 124 extending toward the battery cell 14. With this configuration, it is possible to distribute the load and hence, to increase the strength of the first stationary portion 46.

The insertion hole 26 is inclined relative to the outer wall 14a of the battery cell 14. With this configuration, it becomes easy to guide the case 34 to the insertion hole 26.

Incidentally, the temperature detecting device and the insertion hole structure of the base according to the present invention are not limited to the foregoing embodiment. It is possible to employ various structures without departing from the gist of the present invention. Further, the temperature detecting device according to the present invention is also applicable to other temperature detection objects than high-voltage batteries for electric vehicles and hybrid vehicles. Furthermore, the insertion hole structure of the base according to the present invention can be used not only for the temperature detecting device but also for any attaching structure such as a structure for attaching terminals to electric equipment, and the like.

What is claimed is:

1. A temperature detecting device comprising:
   a temperature detection object;
   a base covering an outer wall of the temperature detection object;
   an insert configured to be inserted into an insertion hole of the base and to be guided to an outer wall of the temperature detection object; and
   a temperature detection unit attached to the insert,
   wherein the insert includes:
   a first surface located near the temperature detection object in an attached state that the insert is attached to the base;
   a second surface located on a back side of the first surface;
   a base portion configured to accommodate the temperature detection unit with a part of the temperature detection unit exposed from the first surface side; and
   a grip portion extending from a starting point at the base portion in a direction away from the temperature detection object in the attached state; and
   wherein the base includes:
   an accommodation portion configured to accommodate the base portion with the part of the temperature detection unit in contact with the temperature detection object in the attached state;
   a first structure configured to guide the first surface toward the temperature detection object at time of insertion of the insert; and
   a second structure configured to guide the second surface toward an upper side of the accommodation portion at the time of the insertion of the insert,
   the first structure includes an engaging claw portion configured to engage the insert in the attached state,
   the insert includes an engagement receiving portion configured to be engaged with the engaging claw portion in the attached state, the engagement receiving portion being provided on at least one side of the base portion in a width direction perpendicular to the insertion direction, the first structure and the second structure are arranged in a face-to-face relation, the first structure is arranged at a position higher than the outer wall of the temperature detection object in a vertical direction to the outer wall, the second structure is arranged at a position higher than the first structure in the vertical direction, and an axis of the insertion hole is inclined relative to a direction parallel to the outer wall and to the vertical direction.

2. The temperature detecting device according to claim 1, wherein the first structure and the second structure are configured to regulate an insertion initial position and/or an insertion direction of the insert.

3. The temperature detecting device according to claim 2, wherein the first structure is equipped with a flexible portion configured to guide the engagement receiving portion while being bent at the time of the insertion of the insert.

4. The temperature detecting device according to claim 1, wherein the insert includes an elastic member which, in the attached state, is interposed between the second surface and an inner surface on an upper side of the accommodation portion to press the base portion toward the temperature detection object.

5. The temperature detecting device according to claim 1, wherein the grip portion is curved to go away from the temperature detection object as the grip portion extends in a direction to an end thereof in the attached state.

* * * * *